United States Patent Office

Re. 28,050
Reissued June 18, 1974

28,050

SULFUR-VULCANIZABLE ELASTOMERIC CO-POLYMERS OF ETHYLENE, PROPYLENE AND ALIPHATIC DIOLEFINS, AND A PROCESS FOR PREPARING SAME

Giulio Natta, and Giorgio Mazzanti, Milan, Italy, and Giorgio Boschi, Brussels, Belgium, assignors to Montecatini Edison, S.p.A., Milan, Italy No Drawing. Original No. 3,280,082, dated Oct. 18, 1966, Ser. No. 668,853, July 1, 1957. Application for reissue Mar. 16, 1973, Ser. No. 342,083, which is a continuation of reissue application Ser. No. 12,899, Feb. 17, 1970, which is a continuation of reissue application Ser. No. 769,452, Oct. 11, 1968, both now abandoned.

Claims priority, application Italy, July 11, 1956, 10,680/56

Int. Cl. C08f *1/34, 15/40*

U.S. Cl. 260—80.7 6 Claims

Matter enclosed in heavy brackets [ ] appears in the original patent but forms no part of this reissue specification; matter printed in italics indicates the additions made by reissue.

*This application is a Rule 60 continuation of our prior copending application Ser. No. 12,899, filed Feb. 17, 1970, which in turn is a streamlined continuation of our prior copending application Ser. No. 769,452, filed Oct. 11, 1968, and now abandoned.*

This invention relates to copolymers of diolefines with mono-olefines and to processes for the production of such copolymers.

The pending application of G. Natta et al., Serial No. 570,961, filed March 12, 1956, now abandoned, discloses that copolymers of diolefins with aliphatic alpha-olefines can be produced from mixtures of the monomers with the aid of catalysts prepared by reacting, in an inert hydrocarbon solvent, a titanium chloride, in particular titanium tetrachloride, with an alkyl aluminum compound, particularly triethyl aluminum or trihexyl aluminum. Those catalysts are heterogeneous and comprise portions having different stereospecificity, as a consequence of which the polymerizates consist, in many instances, of mixtures of homopolymers with minor amounts of copolymers, the former being generally crystalline.

The copolymers present in the mixtures consisted, in general, of mixed copolymers of widely varying compositions. Those copolymers, therefore, were not always found to be most suitable for the production of elastomers having good characteristics. More particularly, the impact resilience of the copolymers in question was not always found to be as high as desirable.

The monomer mixtures polymerized as described consisted of mixtures of alpha-olefines such as butene-1 or pentene-1, with diolefines such as butadiene, pentadiene-1,3 or hexadiene-1,5. Copolymers of the diolefines with ethylene were not disclosed.

It is more difficult to produce copolymers of mono-olefines with diolefines than to produce copolymers of the mono-olefines with each other. It is particularly difficult to produce copolymers from monomer mixtures containing both ethylene and diolefines, especially when more than two monomeric components are present in the mixture. For example, it was not found possible to produce practical yields of copolymers of ethylene with one or more alpha-olefines of the type $CH_2=CHR$ in which R is an alkyl radical and with diolefines, using the heterogeneous catalysts described in the pending application, supra. In fact, when such monomer mixtures were polymerized using those catalysts, the product comprised, prevailingly, mixtures of homopolymers containing only small amounts of copolymers.

We have now found that if specific selected catalysts of the general type obtained by reacting an organometallic compound of a metal of the 1st, 2nd or 3rd group of the Periodic Table with a compound of a transition metal of Groups IV to VI of the Periodic Table are used as polymerization aid, it is possible to obtain true copolymers of the diolefines with mono-olefines including ethylene.

The specific selected catalyst used is one obtained by reacting the organometallic compound with a transition metal compound which is soluble in the inert hydrocarbon solvent used as the polymerization medium. Such medium may be for example, a light gasoline fraction free of olefinic bonds, n-heptane, iso-octane, or anhydrous benzene.

The transition metal compounds which are soluble in the solvents mentioned include liquid halides of the metals such as vanadium oxychloride and vanadium halides in which the vanadium is penta- or tetra-valent, chromium oxydichloride ($CrO_2Cl_2$), and the corresponding compounds of other transition metals of Groups IV to VI of the Mendeleeff Periodic Table.

Lyophilic groups, such as long chain alkyl groups, i.e. those having 4 to 16 carbon atoms, and alkoxy groups, even those of relatively short chain length, tend to render the transition metal compound soluble in the inert hydrocarbons. Compounds containing such groups, for instance such compounds as dibutoxy titanium dichloride $[Ti(OC_4H_9)_2Cl_2]$ may be used as the transition metal compound in preparing the catalyst to be used in producing the the present copolymers.

The organometallic compound may be an alkyl compound of a metal of the 2nd or 3rd group of the Periodic Table, i.e. an alkyl compound of lithium, beryllium, magnesium, zinc, cadmium and other elements of the 2nd group, as well as of aluminum and other elements of the 3rd group.

Generally, the liquid transition metal compound is reacted with an organometallic compound containing alkyl groups attached to the metal atom and which contain 4 to 16 carbon atoms. Excellent results have been obtained by using the catalyst prepared directly from trihexyl aluminum and vanadium oxychloride.

A suitable molar ratio of the transition metal compound to the metal alkyl is from 1:0.5 to 1:10, usually preferably from 1:1 to 1:5.

We find that, when these catalysts prepared from the hydrocarbon-soluble transition metal compound, e.g., vanadium oxychloride, and, for instance, an aluminum alkyl, are used, copolymers of the mono-olefines with diolefines can be obtained in which, within certain limits, the amount of diolefine combined in the copolymer molecule can be predetermined and varied at will.

The present process therefore comprises polymerizing mixtures of mono-olefines with diolefines, particularly diolefines containing a vinyl-type double bond and including isoprene, to true copolymers with the aid of the selected catalyst prepared by reacting the organometallic compound with the transition metal compound which is soluble in the inert hydrocarbon.

The copolymerization of the mixed monomers can be carried out at a relatively low temperature, even at temperatures below 50° C., i.e. at a temperature as low as 0° C., and preferably in an inert, anhydrous hydrocarbon solvent. In general a polymerization temperature between 0° C. and 60° C. is satisfactory.

The crude polymerizate comprising the new copolymers is purified by treatment with solvents acidified with hydrochloric acid, and subsequent complete coagulation with acetone-methanol mixtures.

The results we have obtained are illustrated in the examples given below. Here, it may be pointed out that, by means of solubility determinations coupled with physico-chemical examinations, it has been established that our products are true copolymers, the composition of which can be determined.

For example, when the product obtained by copolymerizing a mixture of propylene and isoprene as in Example 1, is fractionated under nitrogen using, successively, the hot solvents acetone, ether, heptane or carbon tetrachloride, the proportion of the product which is successively extracted is 7%, 53% and 40%, there is no residue after the heptane extraction, and the heptane extract is only slightly (about 15%) crystalline. On the other hand, if a homopolymer of propylene prepared under the same conditions is extracted successively with the same solvents, a residue amounting to 11% of the total polymer remains after the heptane extraction. That residue appears highly crystalline under the X-rays. The heptane extract of the homopolymer is also found to be highly (about 50%) crystalline.

These differences in crystallinity of the heptane extract of the present copolymers and the heptane extract of the homopolymer (polypropylene), as well as the existence of the heptane residue in the case of the homopolymer, are evidence that under the present conditions no highly crystalline homopolymer is produced and that the present products consist of substantially linear and amorphous copolymers.

That the products are copolymers is indicated by other findings as well. For instance, when three-component monomer mixtures containing ethylene are polymerized, such as, for example, a mixture of ethylene, propylene, and isoprene, terpolymers are produced and all of the fractions separated from the crude terpolymer by solvent extraction are amorphous under the X-rays.

Furthermore, the infra-red spectra of all of the products obtained by polymerizing monomer mixtures containing isoprene by the present method show at $6\mu$ the bands due to the unsaturation, at $11.25\mu$ the bands due to double bonds of vinylidene type (which can be attributed to monomeric units of isoprene polymerized with 3,4-enchainment), and the bands due to the presence of internal double bonds (which can be attributed to monomeric units of isoprene polymerized with 1,4-enchainment).

When the polymerizates obtained by polymerizing ternary mixtures of ethylene, propylene and isoprene are subjected to infra-red examination, additional bands due to non-terminal, single methyl groups are revealed at $8.63\mu$ and $8.69\mu$. Bands between $13.6\mu$ and $13.9\mu$, and due to sequences of methylenic groups, are also observed.

All of these findings are evidence that the products are copolymers containing in the polymer molecule units derived from both, or all, of the monomers. The term "co-polymer" as used herein includes terpolymers.

It is not possible to compare the mechanical properties of specimens prepared from the present copolymers of ethylene, propylene and isoprene with the properties of specimens prepared from mechanical or artificial mixtures of the three homopolymers because the homopolymers (polyethylene, polypropylene, polyisoprene) are not compatible.

However, that the present products are true copolymers is evidenced by a comparison of the mechanical properties of specimens prepared from the ethylene-propylene-isoprene copolymer of Example 2 below with the mechanical properties of specimens prepared from mixtures obtained by co-precipitation of an ethylene-propylene copolymer and of polyisoprene; the polyisoprene content of the mixture was equal to the proportion of monomeric units derived from isoprene in the copolymer. The specimens used in making the comparative tests were prepared according to ASTM specifications, using an Amsler apparatus. The grips were separated at a rate of 25 mm./minute. The results are shown in Table I below.

TABLE I

| Product | Ultimate tensile strength, kg./mm.$^2$ | Elongation at break, percent |
|---|---|---|
| Ethylene-propylene-isoprene copolymer | 0.22 | 940 |
| Mixture of an ethylene-propylene copolymer with polyisoprene | 0.05 | 1,620 |

As will be observed from the tabulated data, the specimens prepared from the mixture of polymers have, in practice, mechanical characteristics which are greatly inferior to those of the specimens prepared from the copolymer produced by the present method and using the specific, selected catalyst as described herein.

Additional evidence that the present products are true copolymers containing double bonds in the macromolecules is found in the fact that *they*, [as shown in the examples which follow, these copolymers] can be vulcanized by the methods which are conventional for the vulcanization of unsaturated elastomers.

The elastomers obtained by vulcanizing the copolymers, after mixture thereof with vulcanizing aids of conventional type, have important properties. This is particularly true for the vulcanizates prepared from copolymers obtained from monomer mixtures containing ethylene. Those copolymers, after vulcanization, have an impact resilience which is higher than the impact resilience of vulcanizates obtained from copolymers made from mixtures which do not contain ethylene and, generally speaking, the impact resilience is higher than that of other conventional low-saturation synthetic elastomers such as, for example, butyl rubber.

The following is a comparison of the impact resilience value found for the ethylene-propylene-isoprene terpolymer of present Example 2, with that for the two-component copolymer (propylene-isoprene) of present Example 1, and that for conventional butyl rubber:

| | Percent |
|---|---|
| Ethylene-propylene-isoprene terpolymer (Ex. 2) | 60–65 |
| Propylene-isoprene copolymer (Ex. 1) | 20 |
| Butyl rubber | 17 |

The impact resilience of the three different materials was determined at 25° C. using a Pirelli apparatus of the type of the Goodyear-Healey rebound pendulum.

It will be observed that the presence of the units derived from ethylene in the copolymer molecule has a very pronounced effect on the impact resilience of the elastomer. This is important because the capacity of the ethylene combined in the copolymer molecule to increase the impact resilience of the vulcanized elastomeric product makes it possible to produce satisfactory, useful elastomers from copolymers containing in the copolymer molecule, a preponderant amount by weight of relatively inexpensive mono-olefines and only minor (less than 20%) amounts of the more expensive diolefines.

[The following examples are given to illustrate the invention, it being understood that these examples are not intended as limiting.]

Example 1

A solution of 0.024 mol trihexyl aluminum in 350 ml. n-heptane is introduced, under nitrogen, into a 2100 ml. shaking autoclave previously deaerated. 0.4 mol isoprene (Phillips, pure grade) and a mixture of propylene and propane containing 5.8 mol propylene and 0.7 mol propane are then added. The whole is heated to 50° C., while agitating, and a solution of 0.004 mol $VOCl_3$ in 50 ml. heptane is injected under nitrogen pressure. 0.3 mol isoprene is further injected after one hour and thirty minutes. Three hours after the beginning of the operation the reaction product is discharged, in the form of a viscous solution. The product is separated from the inorganic substances which are present, by treatment with aqueous hydrochloric acid, in a nitrogen atmosphere.

The product separates into two phases, and the heptane phase is treated again with hydrochloric acid and then repeatedly with water. The product is finally completely coagulated by treatment with an excess of an acetone-methanol mixture. After drying under vacuum, 30 g. of a white solid having a rubbery appearance are obtained. The solid is fractionated by successive extraction under nitrogen in a Kumagawa extractor, with acetone, ether and n-heptane.

The acetone extract corresponds to 6.4% and consists of oily products having low molecular weight, and which by infra-red spectrography show a content of propylene and isoprene monomeric units. The ether extract corresponds to 53.6% and consists of a solid product of rubbery appearance which is amorphous under the X-rays. The residue of the ether extraction is completely extractable with warm n-heptane and consists of a solid having intrinsic viscosity of 1.9 in Tetralin solution at 135° C. This fraction shows a 15% crystallinity under the X-rays. In the infra-red spectrum of the ether and heptane extracts, bands due to unsaturation at 6μ and bands due to vinylidene double bonds and to internal double bonds appear besides the bands due to single, non-terminal methyl groups. From the infra-red spectrographic examination one can calculate an isoprene content of about 15% in the ether extract, and of about 10% in the heptane extract.

The raw copolymer obtained as described above is treated in a roll mixer for 10 minutes at 50° C. with 5% sulfur, 2% anti-oxidant and 2% Vulcafor TMT and then cured in a press at 160° C. for 40 minutes. The specimens obtained from the vulcanized product when subjected to a tensile test with a rate of separation of the grips of 25 mm./min., gave the following results—

| | |
|---|---|
| Ultimate tensile strength ____kg./mm.$^2$ | 0.5 |
| Elongation at break ____percent | 625 |
| Secant modulus at 100% elongation ____kg./mm.$^2$ | 0.19 |
| Secant modulus at 200% elongation ____kg./mm.$^2$ | 0.23 |
| Permanent strain at break, determined according to ASTM specification ____percent | 65 |

Example 2

A mixture having the following composition by volume—

| | Percent |
|---|---|
| Propylene | 83.5 |
| Ethylene | 8.0 |
| Propane | 8.5 |

is introduced into a shaking autoclave having a capacity of about 2 liters and used as a reservoir.

This autoclave is then heated to a temperature at which all components are in the gaseous state, while agitating.

A solution of 0.018 mol trihexyl aluminum in 400 ml. n-heptane and 27 g. isoprene are introduced under nitrogen into another shaking autoclave of 2100 ml. capacity previously deaerated. A portion of the gases contained in the reservoir are then passed, up to a pressure of 7 atm. after saturation, into the reaction autoclave while agitating.

A solution of 0.003 mol $VOCl_3$ in 50 ml. n-heptane is then injected into the polymerization autoclave. This autoclave is agitated for about 30 minutes at room temperature, a solution of 13 g. isoprene in 50 ml. heptane is then introduced and *the* [a] mixture of ethylene and propylene is added until the pressure of 7 atm. is reached again.

About one hour after the beginning of the operation the reaction product is discharged in the form of a viscous solution. The product is purified and separated as described in Example 1.

35 g. of a white, solid polymer having the characteristics of a non-vulcanized elastomer are obtained. The product shows, in Tetralin solution at 135° C., an intrinsic viscosity of 4.2, corresponding to a molecular weight of about 300,000, and an iodine number, determined according to Gallo, Wiess and Nelson, of 40, corresponding to an isoprene content of 10.7%.

The infra-red spectra do not show the bands at 10.03 and 11.90μ, due to the polypropylene crystallinity. The absorption at 13.70μ arising from polyethylene crystallinity, is also absent. At 11.25μ the presence of an absorption arising from vinylidene double bonds is detectable, to which an unsaturation band at about 6μ corresponds. The ternary copolymer obtained is fractionated under nitrogen by extraction with hot solvents, using successively ether and heptane. The fraction soluble in ether corresponds to 36% and consists of a solid, rubber product which is amorphous under the X-rays and has an intrinsic viscosity of 1.7.

The residue of the ether extraction is completely extractable with heptane and is a solid, which appears amorphous under the X-rays. This fraction is vulcanized by a 10 minute treatment, at 50° C., in a roll mixer, with 3% sulfur, 2% Vulcafor ZDC, 2% Vulcafor MBT and 2% Vulcafor TMT, and curing in a press at 180° C. for 15 minutes. The specimens obtained were subjected to tensile tests carried out as indicated. The following results were obtained—

| | |
|---|---|
| Ultimate tensile strength ____kg./mm.$^2$ | 0.3 |
| Elongation at break ____percent | 480 |
| Permanent strain at break ____do | 60 |

Example 3

A mixture having the following composition by volume—

| | Percent |
|---|---|
| Propylene | 78 |
| Propane | 10 |
| Ethylene | 12 |

is introduced into a shaking autoclave which serves as a reservoir. The mixture is heated with agitation, to a temperature at which all of the listed components are in the gaseous state.

A solution of 0.025 mol trihexyl aluminum in 400 ml. heptane and 14 g. of isoprene is introduced under nitrogen into the polymerization autoclave. 220 g. propylene, 6 g. ethylene and 31 g. propane are then added. After agitation a pressure of 6 atm. at 30° C. is reached, ethylene and propylene being present in the gaseous phase with a molar ratio propylene-ethylene of about 10/1.

A solution of 0.006 mol $VOCl_3$ in 50 ml. n-heptane is then injected into the autoclave while agitating. In order to keep practically constant the monomer concentration, the mixture of ethylene and propylene contained in the reservoir is continuously added to the reaction mass the pressure being held between 6 and 7 atm. In this way, the molar ratio between the propylene and ethylene present in the gaseous phase of the reaction autoclave varies between 10/1 and 12/1. A solution of 23 g. isoprene in 50 ml. heptane is then injected, about 15 minutes from the beginning of the polymerization. The autoclave is agitated for about 1 hour at a temperature between 30° C. and 45° C. and the reaction product is then discharged. From this product, proceeding as previously described, 35 g. of a solid polymer having a rubbery appearance are separated. The solid is fractionated by extraction with hot solvents.

The acetone extract corresponds to 8% and consists of copolymers of low molecular weight.

The ether extract corresponds to 56% and consists of a solid product having the appearance of a non-vulcanized elastomer. This fraction, in toluene solution at 30° C., has an intrinsic viscosity of 1.85.

The infra-red spectra clearly show the band of the vinylidene double bonds at 11.25μ and then corresponding unsaturation band at about 6μ. The presence of isoprene monomeric units polymerized with 1,4-enchainment is also detectable. Also present are the bands of the methyl groups and the bands corresponding to sequences of methylenic groups. From the infra-red spectra the following composition can be calculated approximately—

| | Percent |
|---|---|
| Isoprene | 8 |
| Propylene | 65 |
| Ethylene | 27 |

The residue of the ether extraction is completely extractable with hot heptane and has an infra-red spectrum similar to that described above. However, the isoprene and propylene contents of this fraction are lower than for the ether extract.

Example 4

A solution of 0.02 mol trihexyl aluminum in 200 ml. n-heptane, and 14 g. of isoprene are introduced under nitrogen into a 2100 ml. shaking autoclave. 150 g. propylene and 10 g. ethylene are added, and a solution of 0.007 mol. $VOCl_3$ in 50 ml. heptane is injected while agitating. Further 14 g. isoprene and 4 g. ethylene are introduced about 40 minutes from the beginning of the operation. This operation is repeated after 2 hours.

During the run, the autoclave temperature varies from 25° C. to 35° C. After about 4 hours the polymerization product is discharged and 52 g. of a solid white product with rubbery appearance are separated.

The infra-red spectra show the bands attributable to isoprene monomeric units polymerized with 3,4-enchainment, the band due to single, non-terminal methyl groups, and the bands arising from sequences of methylenic groups. The iodine number, determined on the total polymer, according to the method mentioned in the preceding examples, is 19, corresponding to an isoprene content of 5.1%, and the intrinsic viscostiy, determined in Tetralin at 135° C., is 3.9.

The raw copolymer, treated in a roll mixer for 10 minutes at 50° C. with 2% sulfur, 5% zinc oxide, 1% stearic acid, 1.5% Vulcafor ZDC, 1% Vulcafor MBT, is vulcanized by curing in a press at 150° C. for 80 minutes.

The following results are obtained from tensile tests carried out with a rate of separation of the grips of 50 mm./min. on specimens obtained from the vulcanized product:

| | | |
|---|---|---|
| Ultimate tensile strength | kg./mm.$^2$ | 0.5 |
| Elongation at break | percent | 740 |
| Permanent strain at break | do | 70 |

In a determination of the swelling ratio carried out on the vulcanized product according to J. P. Flory (Ind. Eng. Chem. 38, 417 (1946), using benzene as a solvent at a tempertaure of 50° C., equilibrium is reached after about 30 hours with a swelling ratio of 7.

Example 5

A solution of 0.01 mol trihexyl aluminum in 200 ml. n-heptane is introduced, under nitrogen, into a 2000 ml. autoclave provided with a stirrer and whose temperature is maintained at 5° C.

A solution of 0.003 mol $VOCl_3$ in 100 mol n-heptane is then added under stirring. After about 5 minutes 230 g. propylene and 95 ml. isoprene, which was purified by chromatography on alumina and distillation on sodium, are added.

The reaction mass is agitated for about 20 hours at temperatures comprised between 5 and 10° C. Operating as described in the previous examples, 45 g. of a solid propylene-isoprene copolymer are isolated.

100 parts by weight of the copolymer are mixed in a roll mixer with 3 parts sulphur, 10 parts zinc oxide, 1 part stearic acid, 1.5 parts zinc diethylcarbamate, 1 part mercaptobenzothiazole, and vulcanized in a parallel plate press at 160° C. for 30 minutes.

The product obtained has the following characteristics:

| | | |
|---|---|---|
| Ultimate tensile stregth | kg./mm.$^2$ | 1.8 |
| Elongation at break | percent | 740 |
| Secant modulus at 200% elongation | kg./mm.$^2$ | 0.46 |
| Impact resilience at 25° C. | percent | 20 |

The mono-olefins which may be present in the starting monomer mixture have the formula $CH_2{=}CHR$ where R is hydrogen or an alkyl radical of from 1 to 6 carbon atoms and include ethylene, propylene, butene-1, etc.

The diolefins which may be present in the monomer mixture include butadiene-1,3-isoprene, hexadiene-1,5 and pentadiene-1,3.

The monomer mixture may contain more than one mono-olefin and/or more than one diolefine.

In general, the catalyst used in polymerizing these monomer mixtures to the copolymers of the invention may be said to be substantially homogeneous.

The proportion of the respective monomers contained in the copolymer molecule may vary, depending upon the relative proportions of the monomers in the starting mixture, and whether or not supplements of one or more of the monomers are added to the reaction mass during the polymerization to compensate for differences in the polymerization rates (rates of acceptance into the copolymer molecule) of the monomers and maintain a more or less constant ratio of the monomers available for copolymerization during the reaction.

The copolymers may contain as low as 10–15% by weight of the diolefine in the molecule, the remaining 85–90% being made up by one or more of the mono-olefines, or the copolymers may contain larger amounts of combined diolefine.

The copolymers are substantially linear, amorphous products having high molecular weights of at least 1000 and up to 100,000 or higher, and are essentially free of homopolymers. They may be vulcanized as shown and used in the production of shaped articles and as threads, sheets, tubes, foils, etc.

Some changes may be made in practicing this invention without departing from the spirit and scope thereof. It is to be understood, therefore, that it is intended to claim as part of the invention, such variations and modifications as lie within the scope of the invention and of the appended claims, and intended to include within the scope of said claims such changes as may be apparent to those skilled in this art in the practice of the principles of the invention as set forth in this specification.

What is claimed is:

1. Sulfur-vulcanizable, elastomeric, solid, essentially amorphous, linear, high molecular weight terpolymerizates of conjugated diolefins selected from the group consisting of butadiene, isoprene, and pentadiene-1,3 with ethylene and propylene, the terpolymerizates being made up of macromolecules in which the ethylene and propylene units predominate and the diolefin units, while being present in a proportion such that the bands due to the double [bands] thereof are readily discernible in the I.R. spectra of the terpolymers, account for less than 20% of the total units forming the macromolecules, the terpolymerizates being further characterized in being essentially free of homopolymers of any of the starting monomers.

2. Sulfur-vulcanizable, elastomeric, solid, essentially amorphous, linear, high molecular weight terpolymerizates of isoprene, ethylene and propylene, said terpolymerizates being made up of macromolecules in which the ethylene and propylene units predominate and the isoprene units, while being present in a proportion such that the bands due to the double [bands] thereof are readily discernible in the I.R. spectra of the terpolymers, account for less than 20% of the total units forming the macromolecules, said terpolymerizates being further characterized in being essentially free of homopolymers of any of the starting monomers.

3. A process for producing sulfur-vulcanizable, elastomeric, essentially amorphous, linear, high molecular weight terpolymerizates of conjugated diolefins selected from the group consisting of butadiene, isoprene, and pentadiene-1,3 with ethylene and propylene, which comprises subjecting a mixture of ethylene, propylene and the selected diolefin, in proportions such that the amount of propylene, in mols, is greater than the amount of ethylene, and the amount of the diolefin is predetermined to result in a terpolymer in which, in the macromolecules forming the same, the diolefin units, while being present in a proportion such that the bands due to the double [bands] thereof are readily discernible in the I.R. spectra of the terpolymers, account for less than 20% of the total units forming the macromolecules, to polymerizing conditions, in a hydrocarbon oslvent polymerization medium, and in contact with a homogeneous catalyst which is a solution, in the hydrocarbon solvent used as the polymerization medium, of the product obtained by mixing an alkyl aluminum compound with a halogen-containing vanadium compound soluble in the hydrocarbon-soluble polymerization medium.

4. The process according to claim 3, characterized in that the starting monomers are ethylene, propylene and isoprene.

5. The process according to claim 3, characterized in that the vanadium compound is vanadium oxychloride and the alkyl aluminum compound is trihexyl aluminum.

*6. A process for producing sulfur-vulcanizable, elastomeric, essentially amorphous, linear, high molecular weight terpolymerizates of an aliphatic conjugated diolefin hydrocarbon containing 4 to 6 carbon atoms in which at least one double bond is in a terminally located vinyl group, with ethylene and propylene, which comprises contacting, under polymerizing conditions, a mixture of ethylene, propylene and said diolefin, with a halogen-containing polymerization catalyst prepared from a hydrocarbon-soluble vanadium compound and an organoaluminum compound, in a liquid polymeriztaion medium which is an inert solvent for said vanadium compound, the amount in said mixture of propylene, in mols, being greater than the amount of ethylene and the amount of said diolefin being predetermined to result in a terpolymer in which, in essentially all macromolecules forming the same, the diolefin units, while being present in a proportion such that the double bonds thereof are readily discernible in the terpolymer, account for less than 20% of the total units forming the macromolecules, to produce said terpolymerizates.*

References Cited

The following references, cited by the Examiner, are of record in the paented file of this patent or the original patent.

UNITED STATES PATENTS

| | | | |
|---|---|---|---|
| 2,039,364 | 5/1936 | Thomas et. al. | 260—88.2 |
| 2,151,382 | 3/1939 | Harmon | 260—80.7 X |
| 2,477,015 | 7/1949 | Sturgis et al. | 260—80.7 X |
| 2,822,357 | 2/1958 | Brebner et al. | 260—94.9 |
| 2,832,759 | 4/1958 | Nowlin et al. | 260—943 |
| 2,962,451 | 11/1960 | Schreyer | 260—882 |
| 2,968,650 | 1/1961 | Baxter et al. | 260—85.3 |
| 3,058,971 | 10/1962 | Miller et al. | 260—85.3 |
| 3,118,864 | 1/1964 | Robinson | 260—85.3 |

FOREIGN PATENTS

| | | |
|---|---|---|
| 534,792 | 5/1955 | Belgium. |
| 538,782 | 12/1955 | Belgium. |
| 543,292 | 6/1956 | Belgium. |

OTHER REFERENCES

Angewandte Chemie, "Stereospecific Catalysts and Isotactic Polymers," June 21, 1956, pp. 393–403.

Gaylord and Mark, *Linear and Stereoregular Addition Polymers,* Interscience Publishers, New York (1959), pp. 139–140.

German and Vaughan, *Ethylene Propylene Terpolymers,* Rubber Chemistry and Technology *40* (3/67): 569–75.

STANFORD M. LEVIN, Primary Examiner

U.S. Cl. X.R.

260—80.78, 85.3 D, 88.2 E